US012761064B2

(12) United States Patent
Wang et al.

(10) Patent No.: US 12,761,064 B2
(45) Date of Patent: Oct. 13, 2026

(54) LIQUID LEVEL SWITCH SYSTEM AND LIQUID LEVEL MEASURING METHOD

(71) Applicant: XI'AN DINGHUA ELECTRONICS CO., LTD, Xi'an City (CN)

(72) Inventors: Pu Wang, Xi'an City (CN); Dinghua Wang, Xi'an City (CN); Rui Wang, Xi'an City (CN)

(73) Assignee: XI'AN DINGHUA ELECTRONICS CO., LTD, Xi'an City (CN)

( * ) Notice: Subject to any disclaimer, the term of this patent is extended or adjusted under 35 U.S.C. 154(b) by 300 days.

(21) Appl. No.: 18/798,110

(22) Filed: Aug. 8, 2024

(65) Prior Publication Data

US 2025/0020500 A1 Jan. 16, 2025

Related U.S. Application Data

(63) Continuation of application No. PCT/CN2022/139841, filed on Dec. 19, 2022.

(30) Foreign Application Priority Data

Feb. 11, 2022 (CN) ......................... 202210126923.6

(51) Int. Cl.
*G01F 23/2965* (2022.01)
*G01F 23/296* (2022.01)
(Continued)

(52) U.S. Cl.
CPC ........ *G01F 23/2965* (2013.01); *G01F 23/296* (2013.01); *G01F 23/2962* (2013.01); *G01F 25/20* (2022.01); *G08B 21/182* (2013.01)

(58) Field of Classification Search
CPC ............... G01F 23/2965; G01F 23/296; G01F 23/2962; G01F 25/20; G08B 21/182
See application file for complete search history.

(56) References Cited

U.S. PATENT DOCUMENTS 4,320,659 A * 3/1982 Lynnworth ............ G01H 15/00 73/290 V
4,934,191 A * 6/1990 Kroening ............. G21C 17/038 73/19.1
(Continued)

FOREIGN PATENT DOCUMENTS

CN 102322920 A 1/2012
CN 114459569 A 5/2022
(Continued)

OTHER PUBLICATIONS

RU-2123172-C1, English Translation (Year: 1998).*
(Continued)

*Primary Examiner* — Ryan D Walsh
(74) *Attorney, Agent, or Firm* — Notaro, Michalos & Zaccaria P.C.

(57) ABSTRACT

Disclosed are a liquid level switch system and a liquid level measurement method. The liquid level switch system has a transmitting probe, a receiving probe and a main unit. The transmitting probe is located at a warning position on the outer wall of a tank body, the receiving probe is located on the outer wall of the tank body, and the transmitting probe and the receiving probe are respectively connected to the main unit by means of cables. A piezoelectric plate is placed on an inclined block to change the incident angle of an ultrasonic signal entering the tank wall so as to generate a longitudinal wave signal and a transverse wave signal, and the main unit judges, according to a signal strength difference value between a longitudinal wave receiving signal and a transverse wave receiving signal, whether the liquid level of the tank body reaches the warning position.

9 Claims, 2 Drawing Sheets

(51) Int. Cl.

| | |
|---|---|
| ***G01F 23/2962*** | (2022.01) |
| ***G01F 25/20*** | (2022.01) |
| ***G08B 21/18*** | (2006.01) |

(56) References Cited

U.S. PATENT DOCUMENTS

| | | | | |
|---|---|---|---|---|
| 2016/0320226 | A1* | 11/2016 | Schaefer | G01F 23/2965 |
| 2017/0010146 | A1* | 1/2017 | Kassubek | G01S 7/52004 |
| 2020/0378818 | A1* | 12/2020 | Heim | G01F 1/66 |
| 2021/0181008 | A1* | 6/2021 | Bernhard | G01F 23/2968 |
| 2022/0178731 | A1* | 6/2022 | Bivolarsky | G01N 29/024 |
| 2022/0178879 | A1* | 6/2022 | Bivolarsky | G01N 29/036 |

FOREIGN PATENT DOCUMENTS

| | | | | |
|---|---|---|---|---|
| JP | H11218436 | A | | 8/1999 |
| JP | 2001194210 | A | | 7/2001 |
| RU | 2123172 | C1 | * | 12/1998 |
| SU | 769346 | A1 | * | 10/1980 |

OTHER PUBLICATIONS

SU-769346-A1, English Translation (Year: 1980).*

Chinese office action for Application No. 202210126923.6, issued on Apr. 26, 2023.

International Search Report for International Application No. PCT/CN2022/139841, Mailed on Mar. 15, 2023.

* cited by examiner

LIQUID LEVEL SWITCH SYSTEM AND LIQUID LEVEL MEASURING METHOD

This patent application is a bypass continuation of International Application No. PCT/CN2022/139841, filed on Dec. 19, 2022, which claims the priority of Chinese Patent Application No. 202210126923.6 filed with the China National Intellectual Property Administration on Feb. 11, 2022 and entitled as "LIQUID LEVEL SWITCH SYSTEM AND LIQUID LEVEL MEASURING METHOD". These applications are incorporated by reference herein in its their entirety as part of the present application.

TECHNICAL FIELD

The present disclosure relates to the technical field of measurement and alarming of a liquid level of a tank body, in particular to a liquid level switch system and a liquid level measuring method.

BACKGROUND

A liquid level switch is an instrument configured to determine whether the liquid level of the tank body reaches a preset height. A non-contact liquid level switch usually uses an external ultrasonic probe for measurement. At present, the measuring principle of externally installed liquid level switch is that a measuring probe is installed at the monitoring point where the liquid level needs to be detected outside the tank wall. The measuring probe transmits an ultrasonic wave into the tank wall. After the ultrasonic wave enters the tank wall, the ultrasonic wave will be reflected back and forth between the inner surface and the outer surface of the tank wall for many times to form a residual vibration signal. The liquid level is determined by the strength of the residual vibration signal in the tank wall received by the measuring probe. Since sound pressure transmission coefficients of the ultrasonic wave which enters air and liquid from an inner wall of the tank are different, when the liquid level in the tank is lower than a monitoring point, the sound pressure transmission coefficient of entering air from the inner wall of the tank is small, the energy loss of the ultrasonic wave which is reflected back and forth between the inner surface and the outer surface of the container wall will be small, and the received residual vibration signal energy will be large. However, when the liquid level in the tank is higher than the monitoring point, the sound pressure transmission coefficient of entering liquid from the inner wall of the tank is large, the energy loss of the ultrasonic wave which is reflected back and forth between the inner surface and the outer surface of the container wall will be large, and the received residual vibration signal energy will be small. There are some defects in such measuring method. For example, the thickened adhesive layer on the inner wall surface of the tank, the liquid temperature, the ambient temperature outside the tank body, etc. change, the signal strength changes greatly after installation, which is high in instability, high in misoperation rate, poor in working stability and poor in reliability. Moreover, since the signal strength is related to the tank wall material, the wall thickness, the liquid composition and the temperature of each tank body, the signal strength on different tank bodies varies greatly, so that it is necessary to calibrate each tank body in the field and manually adjust and set the warning determination value, which leads to heavy workload, low efficiency and reduced reliability. In the prior art, the above problem existing in the liquid level switch which is installed and measured externally is improved. A self-aligning external ultrasonic liquid level switch measuring system is proposed, which determines whether there is liquid through the ratio change of the signal strength of a calibration probe and the signal strength of a high-low measuring probe, which solves the problems that the liquid level switch which is installed and measured externally at present is high in misoperation rate, poor in working stability, poor in reliability, heavy in workload in installation and debugging and low in efficiency, and requires manual periodic calibration and adjustment in field use. However, there are still some defects in the improved technology. For example, a calibration probe and a measurement probe are separately influenced by the environment temperature, time and the like, so that the signal strength between the measurement probe and the calibration probe randomly drifts, and the reliability of measurement and alarming of a liquid level switch is influenced.

SUMMARY

The present disclosure aims to provide a liquid level switch system and a liquid level measuring method, so as to improve the reliability of measurement and alarming of the liquid level switch.

In order to achieve the above objectives, the present disclosure provides the following solution.

A liquid level switch system is provided, including a transmitting probe, a receiving probe and a main unit; wherein the transmitting probe and the receiving probe are connected to the main unit by means of cables, respectively;

- the transmitting probe is installed at a warning position on an outer wall of a tank body, and the transmitting probe is configured to transmit an ultrasonic signal according to a control of the main unit; the transmitting probe includes a piezoelectric plate and an inclined block; the inclined block is installed on the outer wall of the tank body, the piezoelectric plate is located on an inclined plane of the inclined block, and an incident angle of the ultrasonic signal entering the tank wall is changed through the inclined block; and the ultrasonic signal is transmitted into the tank wall to generate a longitudinal wave signal and a transverse wave signal with different refraction angles;
- the receiving probe is installed on the outer wall of the tank body, the receiving probe is separated from the transmitting probe by a preset distance; the longitudinal wave signal and the transverse wave signal with different refraction angles are received by the receiving probe after being reflected in the tank wall for many times; and the receiving probe is configured to send the detected longitudinal wave receiving signal and the detected transverse wave receiving signal to the main unit;
- the main unit is configured to determine whether a liquid level of the tank body reaches the warning position according to a signal strength difference between the longitudinal wave receiving signal and the transverse wave receiving signal.

A liquid level measuring method based on the liquid level switch system is provided, wherein the liquid level measuring method includes:

- controlling, by the main unit, a transmitting probe to transmit the ultrasonic signal; wherein the ultrasonic signal is transmitted into the tank wall to generate the longitudinal wave signal and the transverse wave signal with different refraction angles;

determining, by the main unit, a signal strength difference threshold according to the number of reflections of the longitudinal wave signal and the transverse wave signal;

sending, by the receiving probe, the detected longitudinal wave receiving signal and the detected transverse wave receiving signal to the main unit;

calculating, by the main unit, a signal strength difference between the longitudinal wave receiving signal and the transverse wave receiving signal;

determining, by the main unit, whether the liquid level of the tank body reaches the warning position according to the signal strength difference and the signal strength difference threshold.

Preferably, the main unit determining, by the main unit, the signal strength difference threshold according to the number of reflections of the longitudinal wave signal and the transverse wave signal, which specifically includes:

determining, by the main unit, the signal strength difference threshold y according to the number of reflections of the longitudinal wave signal and the transverse wave signal using a formula $y=(a^{T1})/(b^{T2})\times d$; where T1 is the number of reflections of the longitudinal wave signal; T2 is the number of reflections of the transverse wave signal; a is longitudinal wave transmittance; b is transverse wave transmittance; d is a proportional coefficient.

Preferably, calculating, by the main unit, the signal strength difference between the longitudinal wave receiving signal and the transverse wave receiving signal includes:

using, by the main unit, a formula $x=V1/V2$ to calculate the signal strength difference x between the longitudinal wave receiving signal and the transverse wave receiving signal; where V1 is strength of the longitudinal wave receiving signal, and V2 is strength of the transverse wave receiving signal.

Preferably, determining, by the main unit, the signal strength difference threshold according to the number of reflections of the longitudinal wave signal and the transverse wave signal includes:

determining, by the main unit, the signal strength difference threshold y according to the number of reflections of the longitudinal wave signal and the transverse wave signal using a formula $y=(a^{T1}-b^{T2})\times d$; where T1 is the number of reflections of the longitudinal wave signal; T2 is the number of reflections of the transverse wave signal; a is longitudinal wave transmittance; b is transverse wave transmittance; d is a proportional coefficient.

Preferably, calculating, by the main unit, the signal strength difference between the longitudinal wave receiving signal and the transverse wave receiving signal includes:

using, by the main unit, a formula $x=V1-V2$ to calculate the signal strength difference x between the longitudinal wave receiving signal and the transverse wave receiving signal; where V1 is strength of the longitudinal wave receiving signal, and V2 is strength of the transverse wave receiving signal.

Preferably, determining, by the main unit, whether the liquid level of the tank body reaches the warning position according to the signal strength difference and the signal strength difference threshold includes:

determining, by the main unit, whether the signal strength difference x is greater than y+c to obtain a first determination result: where c is a return difference;

if the first determination result is that the signal strength difference x is greater than y+c, determining that the liquid level of the tank body reaches the warning position;

if the first determination result is that the signal strength difference is less than or equal to y+c, determining whether the signal strength difference x is less than y−c to obtain a second determination result; and if the second determination result is that the signal strength difference x is less than y−c, determining that the liquid level of the tank body does not reach the warning position.

Preferably, before calculating, by the main unit, the signal strength difference between the longitudinal wave receiving signal and the transverse wave receiving signal, the method further includes:

determining, by the main unit, whether strength of the longitudinal wave receiving signal and strength of the transverse wave receiving signal are greater than a strength threshold of the longitudinal wave receiving signal and a strength threshold of the transverse wave receiving signal, respectively;

if the strength of the longitudinal wave receiving signal is greater than the strength threshold of the longitudinal wave receiving signal and the strength of the transverse wave receiving signal is greater than the strength threshold of the transverse wave receiving signal, calculating, by the main unit, the signal strength difference between the longitudinal wave receiving signal and the transverse wave receiving signal.

According to the specific embodiment provided by the present disclosure, the present disclosure discloses the following technical effects.

The present disclosure provides a liquid level switch system and a liquid level measuring method, wherein the liquid level switch system includes a transmitting probe, a receiving probe and a main unit; the transmitting probe is installed at a warning position on an outer wall of a tank body, and is configured to transmit an ultrasonic signal according to the control of the main unit; the transmitting probe includes a piezoelectric plate and an inclined block; the inclined block is installed on the outer wall of the tank body, the piezoelectric plate is located on an inclined plane of the inclined block, and the incident angle of the ultrasonic signal entering the tank wall is changed through the inclined block; and the ultrasonic signal is transmitted into the tank wall to generate a longitudinal wave signal and a transverse wave signal with different refraction angles; the receiving probe is installed on the outer wall of the tank body, the receiving probe is separated from the transmitting probe by a preset distance; the longitudinal wave signal and the transverse wave signal with different refraction angles are received by the receiving probe after being reflected in the tank wall for many times; the receiving probe is configured to send the detected longitudinal wave receiving signal and the detected transverse wave receiving signal to the main unit; the main unit is configured to determine whether the liquid level of the tank body reaches the warning position according to a signal strength difference between the longitudinal wave receiving signal and the transverse wave receiving signal. The liquid level measuring method includes: controlling, by a main unit, a transmitting probe to transmit an ultrasonic signal; wherein the ultrasonic signal is transmitted into the tank wall to generate a longitudinal wave signal and a transverse wave signal with different refraction angles; determining, by the main unit, a signal strength difference threshold according to the number of reflections of the longitudinal wave signal and the transverse wave signal; sending, by the receiving probe, the detected longitudinal wave receiving signal and the detected transverse wave receiving signal to the main unit; calculating, by the main unit, a signal strength difference between the longitudinal wave receiving signal and the transverse wave receiving signal, and determining whether the liquid level of the tank body reaches the warning position according to the signal strength difference and the signal strength difference threshold. The signal strength difference between the longitudinal wave receiving signal and the transverse wave receiving signal generated when the same probe transmits an ultrasonic signal is used to determine and read the liquid level, so that the problems that since a calibration probe and a measurement probe are separately influenced by the environment temperature, time and the like, the signal strength between the measurement probe and the calibration probe randomly drifts, and the reliability of measurement and alarming of a liquid level switch is influenced are solved, and the reliability of measurement and alarming of the liquid level switch is improved.

In addition, when being compared with the signal strength information of the probe, the present disclosure can self-determine whether the signal state of the probe is normal by determining whether the strength of the longitudinal wave receiving signal and the strength of the transverse wave receiving signal are greater than the strength threshold of the longitudinal wave receiving signal and the strength threshold of the transverse wave receiving signal, respectively, so as to further ensure the reliability of measurement and alarming of the liquid level switch.

BRIEF DESCRIPTION OF THE DRAWINGS

In order to explain the embodiments of the present disclosure or the technical solutions in the prior art more clearly, the drawings that need to be used in the embodiments will be briefly introduced hereinafter. Obviously, the drawings in the following description are only some embodiments of the present disclosure. For those skilled in the art, other drawings can be obtained according to these drawings without creative labor.

Description of reference numbers 1. Transmitting probe, 2. Receiving probe, 3. Main unit, 4. Tank wall, 5. Ultrasonic signal, 6. Longitudinal wave signal, 7. Transverse wave signal, 8. Cables, 101. Piezoelectric plate, 102. Inclined block.

DETAILED DESCRIPTION OF THE EMBODIMENTS

The technical solutions in the embodiments of the present disclosure will be clearly and completely described with reference to the drawings in the embodiments of the present disclosure hereinafter. Obviously, the described embodiments are only some embodiments of the present disclosure, rather than all of the embodiments. Based on the embodiments of the present disclosure, all other embodiments obtained by those skilled in the art without creative labor fall within the scope of protection of the present disclosure.

The present disclosure aims to provide a liquid level switch system and a liquid level measuring method, so as to improve the reliability of measurement and alarming of the liquid level switch.

In order to make the above objects, features and advantages of the present disclosure more obvious and understandable, the present disclosure will be explained in further detail with reference to the drawings and detailed description hereinafter.

Figure 1:
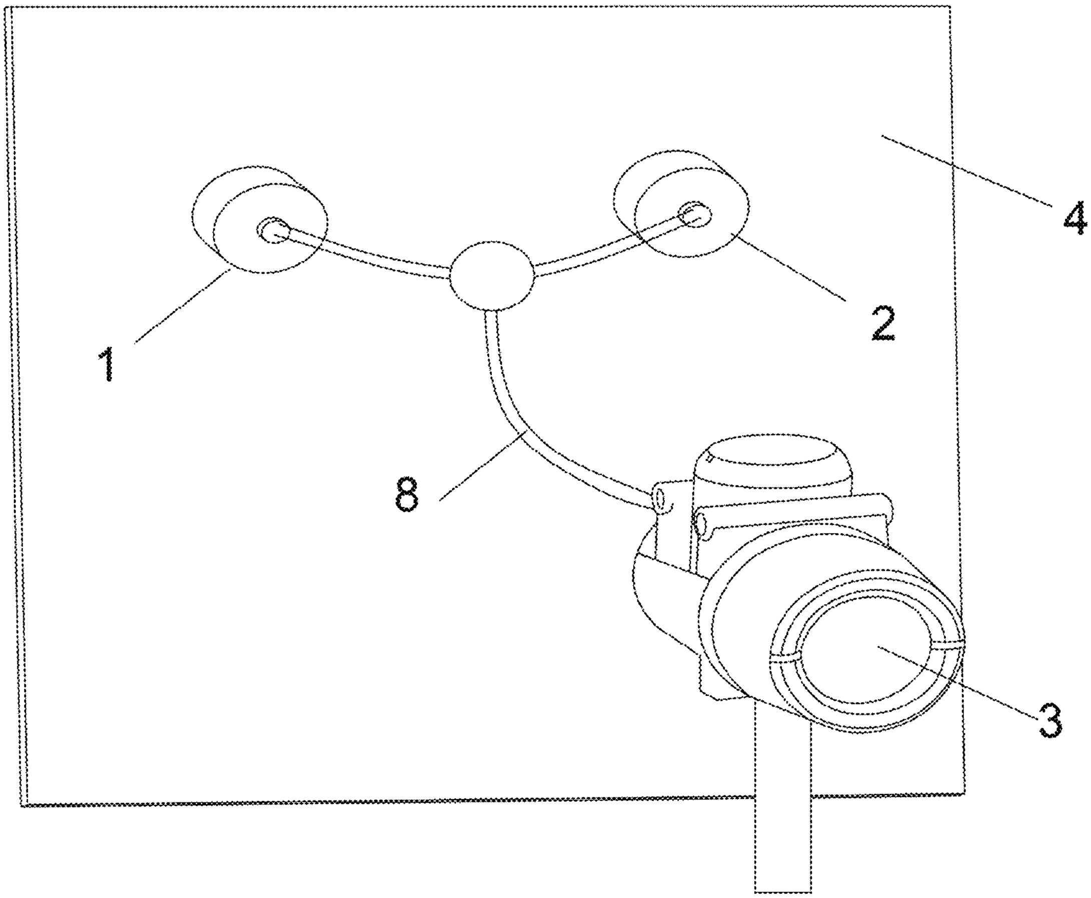
FIG. 1 is a schematic diagram of a liquid level switch system according to the present disclosure.
Figure 2:
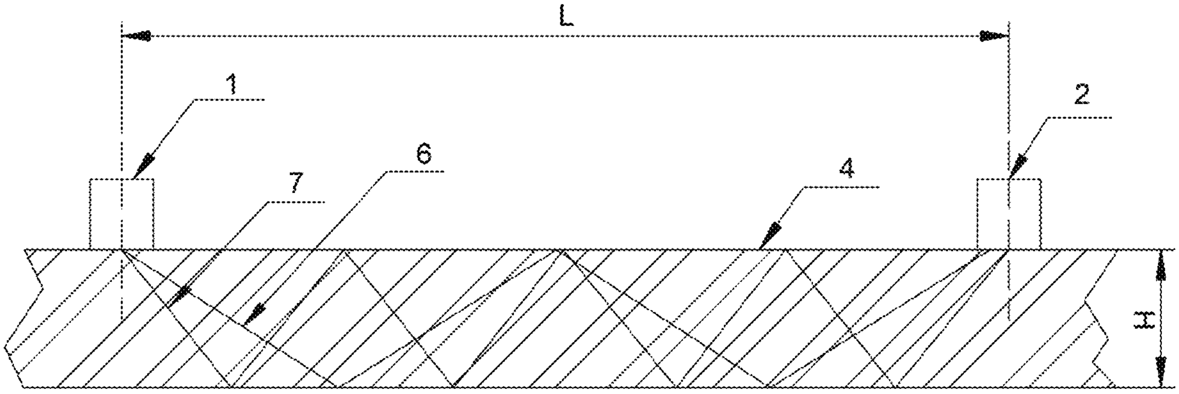
FIG. 2 is a schematic diagram of the installation of a transmitting probe and a receiving probe in a liquid level switch system according to the present disclosure.

FIG. 1 is a schematic diagram of a liquid level switch system according to the present disclosure. FIG. 2 is a schematic diagram of the installation of a transmitting probe and a receiving probe in a liquid level switch system according to the present disclosure. As shown in FIG. 1 and FIG. 2, the liquid level switch system according to the present disclosure includes a transmitting probe 1, a receiving probe 2 and a main unit 3. The transmitting probe 1 is installed at a warning position on an outer wall of a tank body. The receiving probe 2 is installed on the outer wall of the tank body, and is separated from the transmitting probe 1 by a preset distance L. The transmitting probe 1 and the receiving probe 2 are connected to the main unit 3 by means of cables 8, respectively. The warning position is a position of a monitoring point outside a tank wall where a liquid level needs to be detected.

Figure 3:
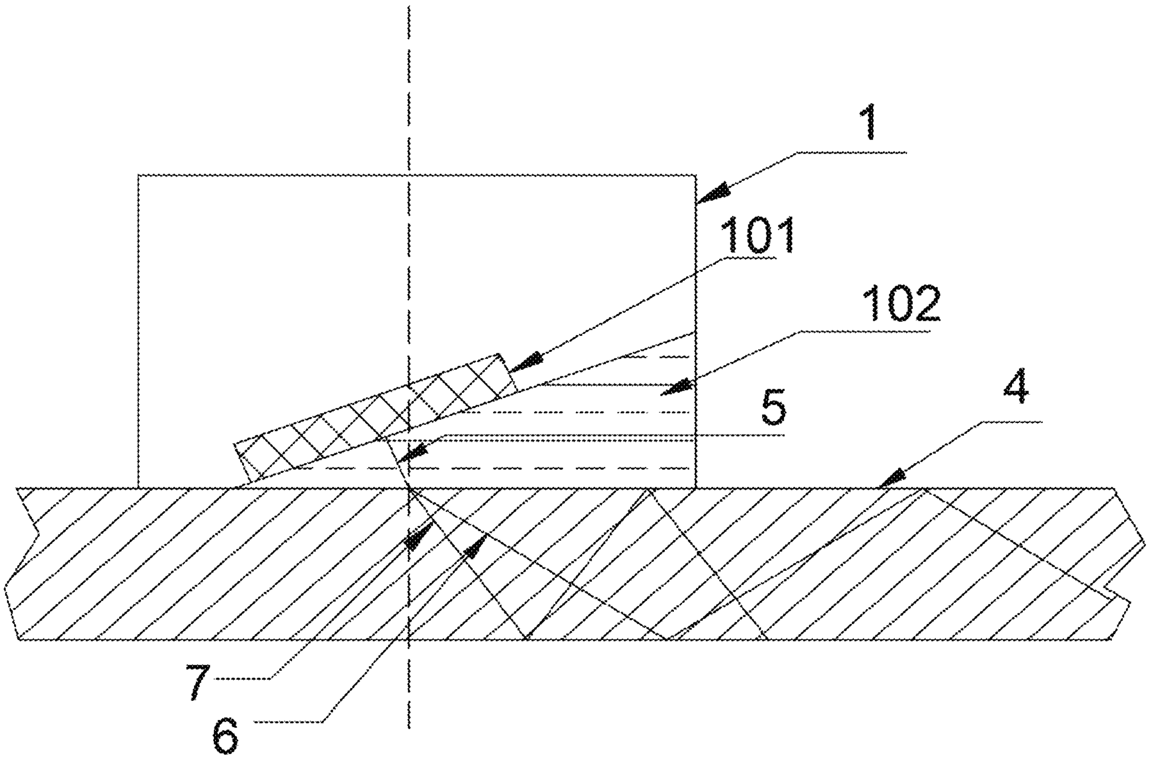
FIG. 3 is a schematic structural diagram of a transmitting probe according to the present disclosure.

FIG. 3 is a schematic structural diagram of a transmitting probe according to the present disclosure. As shown in FIG. 3, the transmitting probe 1 includes a piezoelectric plate 101 and an inclined block 102. Specifically, the inclined block 102 is installed on the outer wall of the tank body, and the piezoelectric plate 101 is located on the inclined plane of the inclined block 102. The piezoelectric plate 101 is configured to transmit an ultrasonic signal 5 according to the control of the main unit 3. The inclined block 102 is configured to change the incident angle α of the ultrasonic signal 5 entering a tank wall 4, so that the ultrasonic signal 5 is transmitted into the tank wall 4 to generate a longitudinal wave signal 6 and a transverse wave signal 7 with different refraction angles. When the angle α of the ultrasonic signal 5 incident on the tank wall 4 is greater than zero and less than a first critical angle, the angle of the inclined block with the maximal strength of the transverse wave signal 7 entering the tank wall 4 is taken. That is, according to the acoustic impedance value of the material of the tank wall 4, inclined blocks 102 with different angles are installed at the front end of the transmitting probe 1 to adjust the incident angle α of the ultrasonic signal 5 transmitted by the transmitting probe 1. The ultrasonic signal is incident on the tank wall 4 at a certain angle. The longitudinal wave signal 6 and the transverse wave signal 7 which are clear and balanced will be generated in the tank wall 4 at the same time. When the angle of the inclined block 102 is adjusted, the strength of the transverse wave signal 7 entering the tank wall will reach the peak, and the strength of the longitudinal wave signal 6 will be as large as possible. The transmission time of the longitudinal wave signal 6 is short, and the transmission time of the transverse wave signal 7 is long, so that the receiving probe 2 can receive the longitudinal wave signal 6 and the transverse wave signal 7 successively.

In practical application, the relationship between the incident angle α of the ultrasonic signal 5 entering the tank wall 4 and the refraction angle of the longitudinal wave signal 6 or the transverse wave signal 7 is as follows:

$$\sin\alpha / c1 = \sin\beta1 / c2 = \sin\beta2 / c3 \tag{1}$$

where $\alpha$ is the incident angle of the ultrasonic signal 5, $\beta 1$ is the refraction angle of the longitudinal wave signal, $\beta 2$ is the refraction angle of the transverse wave signal, c1 is the sound velocity in the incident medium, c2 is the sound velocity of a longitudinal wave in the refractive medium, and c3 is the sound velocity of the transverse wave in the refractive medium.

According to the present disclosure, the angle $\alpha$ of the ultrasonic signal 5 incident on the tank wall 4 is adjusted by assembling and installing inclined blocks 102 with different inclination angles, so that the signal transmitted into tank wall 4 generates both the longitudinal wave signal 6 and the transverse wave signal 7. Because the refraction angles of the transverse wave signal 7 and the longitudinal wave signal 6 in the tank wall 4 are different, the acoustic path of the transverse wave signal and the acoustic path of the longitudinal wave signal to the receiving probe 2 are different, so that the number of reflections of the longitudinal wave signal 6 and the transverse wave signal 7 between the two probes are different. Because the distance L between the two probes is a definite value after installation, the wall thickness H of the installed tank wall 4 is also a definite value, and the transmission speed of the two waveform signals in the installed tank wall 4 is a definite value, the number of reflections of the two waveform signals between the transmitting probe 1 and the receiving probe 2 in the tank wall 4 can be calculated. The calculation formula of the number of reflections is as follows:

$$T = L \times \tan\beta / H \tag{2}$$

where T is the number of reflections; L is the probe distance; $\beta$ is the refraction angle; H is the wall thickness.

In practical application, the transmitting probe 1 uses the transmitting signal (i.e. ultrasonic signal 5) to be obliquely incident to the tank wall 4, which can improve the focus of the main beam signal. Therefore, the strength of the receiving signal of the receiving probe 2 is increased, the interference signals resulted from reflection in other directions are reduced, the interference signals resulted from other non-main beam angles are reduced, and the signal-to-noise ratio is improved. Moreover, after the probes (including the transmitting probe 1 and the receiving probe 2) are installed and fixed on the tank wall 4, the liquid level switch system is started to control the transmitting probe 1 to automatically sweep the frequency, the receiving signals are collected for comparison in terms of strength and spectrum, and the peak frequency with the highest signal-to-noise ratio is selected as the transmitting frequency when the system operates, so that the signal-to-noise ratio of the signal is improved.

The receiving probe 2 is configured to receive the longitudinal wave signal 6 and the transverse wave signal 7 transmitted into the tank wall, and send the received longitudinal wave receiving signal and the received transverse wave receiving signal to the main unit 3. Specifically, because the refraction angles of the transverse wave signal 7 and the longitudinal wave signal 6 in the tank wall are different, the acoustic paths to the receiving probe 2 are different, and the propagation speed of the longitudinal wave signal 6 is greater than that of the transverse wave signal 7. For example, the distance between the two probes is 360 mm, the tank wall is made of a steel plate, the wall thickness is 9 mm, the transverse wave velocity of the steel plate is 2540 m/s to 3268 m/s, the longitudinal wave velocity of the steel plate is 4572 m/s to 5883 m/s, the longitudinal wave propagation time is 61 μs to 78 μs, and the transverse wave propagation time is 111 μs to 141 μs. Since the acoustic paths of the transverse wave signal 7 and the longitudinal wave signal 6 are different, the number of reflections between the two probes is different. Because the distance L between the two probes is a definite value after installation, the wall thickness H of the tank wall is a definite value, and the transmission speed of the two waves in the installed tank wall is a definite value, the number of reflections of the two waveforms between the transmitting probe 1 and the receiving probe 2 in the tank wall can be calculated.

Specifically, the number of reflections of the longitudinal wave is calculated as:

$$T1 = L \times \tan\beta 1 / H \tag{3}$$

The number of reflections of the transverse wave is calculated as:

$$T2 = L \times \tan\beta 2 / H \tag{4}$$

where L is the probe distance; $\beta 1$ is the refraction angle of the longitudinal wave signal, $\beta 2$ is the refraction angle of the transverse wave signal, and H is the thickness of the tank wall. As a specific embodiment, the distance between two probes is L=360 mm, and the thickness of the steel plate on the tank wall is H=9 mm.

The main unit 3 is used to set the transmitting frequency, the strength threshold of the receiving signal and the signal strength difference threshold, process the received signal to obtain the signal strength, and determine whether the liquid level of the tank body reaches the warning position according to the signal strength, the proportion and the comparison result. The principle of determination is as follows. When the liquid level in the storage tank does not exceed the warning position of the storage tank, both the longitudinal wave and the transverse wave are approximately total reflections with respect to air reflections. Therefore, the signal strength of the attenuation generated by the signal reflection is approximately the same. When the liquid level in the storage tank exceeds the warning position, the signal attenuations of generated by the longitudinal wave signal 6 and the transverse wave signal 7 are different due to different number of reflections. Therefore, when there is liquid, the signal strength of the longitudinal wave signal 6 and that of the transverse wave signal 7 are both small, and the ratio of the signal strength of the two waveforms changes. When there is no liquid, the signal strength of the longitudinal wave signal 6 and that of the transverse wave signal 7 are both large, and the ratio of the signal strength of the two waveforms does not change. Therefore, it can be reliably determined whether the liquid level in the tank exceeds the warning line according to the change of the strength ratio of the longitudinal wave signal 6 and the transverse wave signal 7.

Based on the liquid level switch system, the present disclosure further provides a liquid level measuring method, which includes the following steps.

Step (1): The main unit 3 controls the transmitting probe 1 to transmit an ultrasonic signal 5. The ultrasonic signal 5 is transmitted into the tank wall 4 to generate a longitudinal wave signal 6 and a transverse wave signal 7 with different refraction angles Step (2): The main unit 3 determines a signal strength difference threshold y according to the number of reflections of the longitudinal wave signal 6 and the transverse wave signal 7.

In the liquid level switch system, the signal strength difference threshold y is set, and it is determined using the signal strength difference x and the signal strength difference threshold y between the longitudinal wave receiving signal and the transverse wave receiving signal which are actually received. The change characteristics of the signal strength difference x between the longitudinal wave signal and the transverse wave signal with liquid and without liquid are used to set a comparison rule to determine whether there is liquid, that is, whether the liquid level of the tank body reaches the warning position.

The present disclosure provides two calculation methods of the signal strength difference x and the corresponding calculation method of the signal strength difference threshold y. The two calculation methods of the signal strength difference threshold y are as follows.

Method 1: The main unit 3 determines the signal strength difference threshold y according to the number of reflections of the longitudinal wave signal 6 and the transverse wave signal 7 using the formula $y=(a^{T1})/(b^{T2})\times d$; where T1 is the number of reflections of the longitudinal wave signal; T2 is the number of reflections of the transverse wave signal; a is longitudinal wave transmittance, that is, the transmittance from the tank wall to the medium; b is transverse wave transmittance, that is, the transmittance from the tank wall to the medium; d is a proportional coefficient, which can be adjusted within the range of greater than 0 and less than 100% and is taken as 50% as a specific embodiment.

Method 2: The main unit determines the signal strength difference threshold y according to the number of reflections of the longitudinal wave signal and the transverse wave signal using the formula $y=(a^{T1}-b^{T2})\times d$.

Step (3): The receiving probe 2 sends the detected longitudinal wave receiving signal and the detected transverse wave receiving signal to the main unit 3.

In the liquid level switch system, the determination of the strength of the receiving signal and the strength threshold of the receiving signal are taken as the normal working condition of the system. Specifically, the main unit 3 determines whether the strength V1 of the longitudinal wave receiving signal and the strength V2 of the transverse wave receiving signal are greater than the strength threshold V10 of the longitudinal wave receiving signal and the strength threshold V20 of the transverse wave receiving signal, respectively. When V1>V10 and V2>V20, the receiving signal is valid and the system operates normally. Otherwise, the system issues an alarm. That is, when the strength V1 of the longitudinal wave receiving signal is greater than the strength threshold V10 of the longitudinal wave receiving signal and the strength V2 of the transverse wave receiving signal is greater than the strength threshold V20 of the transverse wave receiving signal, the main unit 3 determines that the receiving signal is valid and the working conditions of the system are normal. At this time, the main unit 3 calculates the signal strength difference between the longitudinal wave receiving signal and the transverse wave receiving signal. Otherwise, the main unit 3 can issue an alarm.

Step (4): The main unit 3 calculates a signal strength difference between the longitudinal wave receiving signal and the transverse wave receiving signal.

On the premise that the working conditions of the system are normal, the main unit 3 calculates the signal strength difference x between the strength V1 of the longitudinal wave receiving signal and the strength V2 of the transverse wave receiving signal. Specifically, corresponding to two calculation methods of the signal strength difference threshold y, the present disclosure provides two calculation methods of the signal strength difference x as follows.

When the signal strength difference threshold value $y=(a^{T1})/(b^{T2})\times d$, the main unit 3 uses a formula x=V1/V2 to calculate the signal strength difference x between the longitudinal wave receiving signal and the transverse wave receiving signal; where V1 is the strength of the longitudinal wave receiving signal and V2 is the strength of the transverse wave receiving signal.

When the signal strength difference threshold value $y=(a^{T1}-b^{T2})\times d$, correspondingly, the main unit 3 uses a formula x=V1−V2 to calculate the signal strength difference x between the longitudinal wave receiving signal and the transverse wave receiving signal.

Step (5): The main unit 3 determines whether the liquid level of the tank body reaches the warning position according to the signal strength difference x and the signal strength difference threshold y.

Specifically, when x>(v+c), it is determined as a liquid state, and the system issues an alarm. Otherwise, the state remains unchanged. When x<(y−c), it is determined as a liquid-free state. Otherwise, the state remains unchanged, c is a return difference. The return difference c is determined according to the accuracy requirements and the fluctuation of the liquid, so as to avoid the system from giving an alarm all the time because the liquid level fluctuates back and forth near the warning line. That is, the main unit 3 determines whether the signal strength difference x is greater than y+c to obtain a first determination result. If the first determination result is that the signal strength difference x is greater than y+c, it is determined that the liquid level of the tank body reaches the warning position, and the system issues an alarm. If the first determination result is that the signal strength difference is less than or equal to y+c, it is determined whether the signal strength difference x is less than y−c to obtain a second determination result. If the second determination result is that the signal strength difference x is less than y−c, it is determined that the liquid level of the tank body does not reach the warning position. Otherwise, the state remains unchanged.

Because the longitudinal wave signal and the transverse wave signal generated when the same probe transmits an ultrasonic signal are influenced by common interference factors such as the liquid temperature and the ambient temperature outside the tank body in the same way, the signal strength difference between the longitudinal wave receiving signal and the transverse wave receiving signal generated when the same probe transmits an ultrasonic signal is used to determine and read the liquid level, which can solve the problem of low reliability resulted from the common interference to the probe signal due to the reasons such as probe coupling, signal reflection and probe temperature drift when the ultrasonic probe is installed on the outer wall of the tank body, and improve the reliability of measurement and alarming of the liquid level switch. In addition, when being compared with the signal strength information of the probe, the present disclosure can self-determine whether the signal state of the probe is normal by determining whether the strength of the longitudinal wave receiving signal and the strength of the transverse wave receiving signal are greater than the strength threshold of the longitudinal wave receiving signal and the strength threshold of the transverse wave receiving signal, respectively, so as to further ensure the reliability of measurement of the system.

In this specification, various embodiments are described in a progressive way. The differences between each embodiment and other embodiments are highlighted, and the same and similar parts of various embodiments can be referred to each other.

In the present disclosure, specific examples are applied to illustrate the principle and implementation of the present disclosure, and the explanations of the above embodiments are only used to help understand the method and core ideas of the present disclosure. At the same time, according to the idea of the present disclosure, there will be some changes in the detailed description and application scope for those skilled in the art. To sum up, the contents of the specification should not be construed as limiting the present disclosure.

What is claimed is:

1. A liquid level switch system, comprising a transmitting probe, a receiving probe and a main unit; wherein the transmitting probe and the receiving probe are connected to the main unit by means of cables, respectively;

the transmitting probe is installed at a warning position on an outer wall of a tank body, and the transmitting probe is configured to transmit an ultrasonic signal according to a control of the main unit; the transmitting probe comprises a piezoelectric plate and an inclined block; the inclined block is installed on the outer wall of the tank body, the piezoelectric plate is located on an inclined plane of the inclined block, and an incident angle of the ultrasonic signal entering a tank wall is changed through the inclined block; and the ultrasonic signal is transmitted into the tank wall to generate a longitudinal wave signal and a transverse wave signal with different refraction angles;

the receiving probe is installed on the outer wall of the tank body, the receiving probe is separated from the transmitting probe by a preset distance; the longitudinal wave signal and the transverse wave signal with different refraction angles are received by the receiving probe after being reflected in the tank wall for many times; and the receiving probe is configured to send the detected longitudinal wave receiving signal and the detected transverse wave receiving signal to the main unit;

the main unit is configured to determine whether a liquid level of the tank body reaches the warning position according to a signal strength difference between the longitudinal wave receiving signal and the transverse wave receiving signal.

2. A liquid level measuring method based on the liquid level switch system according to claim 1, wherein the liquid level measuring method comprises:

controlling, by the main unit, the transmitting probe to transmit the ultrasonic signal; wherein the ultrasonic signal is transmitted into the tank wall to generate the longitudinal wave signal and the transverse wave signal with different refraction angles;

determining, by the main unit, a signal strength difference threshold according to a number of reflections of the longitudinal wave signal and the transverse wave signal;

sending, by the receiving probe, the detected longitudinal wave receiving signal and the detected transverse wave receiving signal to the main unit;

calculating, by the main unit, a signal strength difference between the longitudinal wave receiving signal and the transverse wave receiving signal; and determining, by the main unit, whether the liquid level of the tank body reaches the warning position according to the signal strength difference and the signal strength difference threshold.

3. The liquid level measuring method according to claim 2, wherein the main unit determining, by the main unit, the signal strength difference threshold according to the number of reflections of the longitudinal wave signal and the transverse wave signal comprises:

determining, by the main unit, the signal strength difference threshold y according to the number of reflections of the longitudinal wave signal and the transverse wave signal using a formula $y=(a^{T1})/(b^{T2})\times d$; wherein T1 is a number of reflections of the longitudinal wave signal; T2 is a number of reflections of the transverse wave signal; a is longitudinal wave transmittance; b is transverse wave transmittance; d is a proportional coefficient.

4. The liquid level measuring method according to claim 3, wherein calculating, by the main unit, the signal strength difference between the longitudinal wave receiving signal and the transverse wave receiving signal comprises:

using, by the main unit, a formula $x=V1/V2$ to calculate the signal strength difference x between the longitudinal wave receiving signal and the transverse wave receiving signal; wherein V1 is strength of the longitudinal wave receiving signal, and V2 is strength of the transverse wave receiving signal.

5. The liquid level measuring method according to claim 4, wherein determining, by the main unit, whether the liquid level of the tank body reaches the warning position according to the signal strength difference and the signal strength difference threshold comprises:

determining, by the main unit, whether the signal strength difference x is greater than y+c to obtain a first determination result; wherein c is a return difference;

if the first determination result is that the signal strength difference x is greater than y+c, determining that the liquid level of the tank body reaches the warning position;

if the first determination result is that the signal strength difference is less than or equal to y+c, determining whether the signal strength difference x is less than y−c to obtain a second determination result; and if the second determination result is that the signal strength difference x is less than y−c, determining that the liquid level of the tank body does not reach the warning position.

6. The liquid level measuring method according to claim 2, wherein determining, by the main unit, the signal strength difference threshold according to the number of reflections of the longitudinal wave signal and the transverse wave signal comprises:

determining, by the main unit, the signal strength difference threshold y according to the number of reflections of the longitudinal wave signal and the transverse wave signal using a formula $y=(a^{T1}-b^{T2})\times d$; wherein T1 is a number of reflections of the longitudinal wave signal; T2 is a number of reflections of the transverse wave signal; a is longitudinal wave transmittance; b is transverse wave transmittance; d is a proportional coefficient.

7. The liquid level measuring method according to claim 6, wherein calculating, by the main unit, the signal strength difference between the longitudinal wave receiving signal and the transverse wave receiving signal comprises:

using, by the main unit, a formula $x=V1-V2$ to calculate the signal strength difference x between the longitudinal wave receiving signal and the transverse wave receiving signal; wherein V1 is strength of the longitudinal wave receiving signal, and V2 is strength of the transverse wave receiving signal.

8. The liquid level measuring method according to claim 7, wherein determining, by the main unit, whether the liquid level of the tank body reaches the warning position according to the signal strength difference and the signal strength difference threshold comprises:

determining, by the main unit, whether the signal strength difference x is greater than y+c to obtain a first determination result; wherein c is a return difference;

if the first determination result is that the signal strength difference x is greater than y+c, determining that the liquid level of the tank body reaches the warning position;

if the first determination result is that the signal strength difference is less than or equal to y+c, determining whether the signal strength difference x is less than y−c to obtain a second determination result; and if the second determination result is that the signal strength difference x is less than y−c, determining that the liquid level of the tank body does not reach the warning position.

9. The liquid level measuring method according to claim 2, wherein before calculating, by the main unit, the signal strength difference between the longitudinal wave receiving signal and the transverse wave receiving signal, the method further comprises:

determining, by the main unit, whether strength of the longitudinal wave receiving signal and strength of the transverse wave receiving signal are greater than a strength threshold of the longitudinal wave receiving signal and a strength threshold of the transverse wave receiving signal, respectively;

if the strength of the longitudinal wave receiving signal is greater than the strength threshold of the longitudinal wave receiving signal and the strength of the transverse wave receiving signal is greater than the strength threshold of the transverse wave receiving signal, calculating, by the main unit, the signal strength difference between the longitudinal wave receiving signal and the transverse wave receiving signal.

* * * * *